(12) United States Patent
Gatti et al.

(10) Patent No.: US 10,036,502 B2
(45) Date of Patent: Jul. 31, 2018

(54) FLUID TRANSMISSION COUPLING WITH INDEPENDENT MEMBER PRESSURE RELIEVING CAM

(71) Applicant: STUCCHI S.p.A., Brignano Gera d'Adda (IT)

(72) Inventors: Gianmarco Gatti, Pognano (IT); Sergio Tivelli, Cividate al Piano (IT)

(73) Assignee: STUCCHI S.P.A., Brignano Gera d'Adda (BG) (IT)

( * ) Notice: Subject to any disclaimer, the term of this patent is extended or adjusted under 35 U.S.C. 154(b) by 24 days.

(21) Appl. No.: 15/035,304

(22) PCT Filed: Nov. 10, 2014

(86) PCT No.: PCT/EP2014/074119
§ 371 (c)(1),
(2) Date: May 9, 2016

(87) PCT Pub. No.: WO2015/067793
PCT Pub. Date: May 14, 2015

(65) Prior Publication Data
US 2016/0290542 A1 Oct. 6, 2016

(30) Foreign Application Priority Data
Nov. 11, 2013 (IT) .............................. MI2013A1865

(51) Int. Cl.
*F16L 37/32* (2006.01)
*F16L 37/23* (2006.01)
(Continued)

(52) U.S. Cl.
CPC ............ *F16L 37/32* (2013.01); *F16K 11/185* (2013.01); *F16L 37/23* (2013.01); *F16L 37/56* (2013.01)

(58) Field of Classification Search
CPC . F16L 37/32; F16L 37/56; F16L 37/23; F16L 37/413; F16L 2201/80; F16L 37/36;
(Continued)

(56) References Cited

U.S. PATENT DOCUMENTS

| 1,478,289 A | 12/1923 | Mahoney |
| 4,348,917 A | 9/1982 | Gardner et al. |
| 2006/0273580 A1 | 12/2006 | Marquis |

FOREIGN PATENT DOCUMENTS

| EP | 0 048 822 | 4/1982 |
| GB | 555181 | 8/1943 |

OTHER PUBLICATIONS

International Search Report dated Feb. 25, 2015 in International Application No. PCT/EP2014/074119.
(Continued)

*Primary Examiner* — Michael R Reid
(74) *Attorney, Agent, or Firm* — Wenderoth, Lind & Ponack, L.L.P.

(57) ABSTRACT

A fluid transmission fitting (100) includes at least two female couplers (47) inserted within a hydraulic feeding block (1), and at least two respective male couplers (48), which can be coupled to the female couplers (47). The block (1) includes at least two hydraulic lines (49) and at least one draining line (50), and a lever (4) integral with an independent member (82, 83) cam (7) adapted to relieve the pressure from a chamber (54) inside each female coupler (47) and adapted to uncouple the male coupler (48) from the respective female coupler (47). Each female coupler (47) includes a pressure relief valve (51), which puts the chamber (54) into connection with the draining line (50).

2 Claims, 21 Drawing Sheets

(51) Int. Cl.
*F16L 37/56* (2006.01)
*F16K 11/18* (2006.01)

(58) Field of Classification Search
CPC ... Y10G 137/87925; Y10G 137/87933; Y10G
137/87965; Y10G 137/87973; Y10G
137/88038; Y10G 137/88046; Y10G
137/87981; Y10G 137/87997; Y10G
137/88005; Y10G 137/86919; Y10G
137/87161; F16K 11/185; F16K 11/14;
F16K 11/10
USPC ...... 137/614.11, 614.13, 614.14, 627.5, 595,
137/614, 614.01, 614.05, 614.06, 614.18,
137/614.19; 251/231, 236, 243, 149.9,
251/149.1, 78; 285/124.5
See application file for complete search history.

(56) References Cited

OTHER PUBLICATIONS

Written Opinion of the International Preliminary Examining Authority dated Oct. 22, 2015 in International Application No. PCT/EP2014/074119.
International Preliminary Report on Patentability dated Feb. 9, 2016 in International Application No. PCT/EP2014/074119.

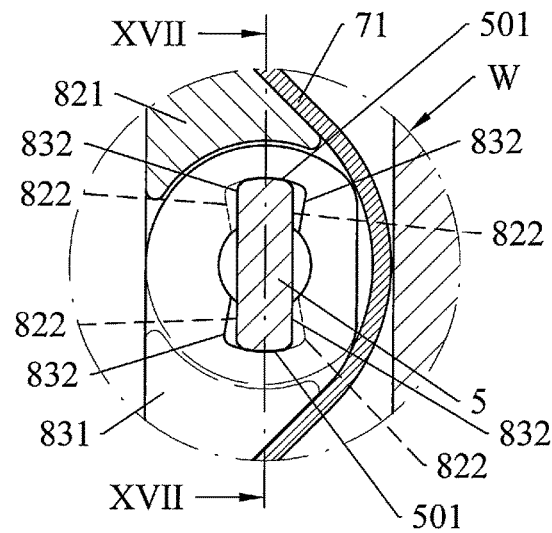
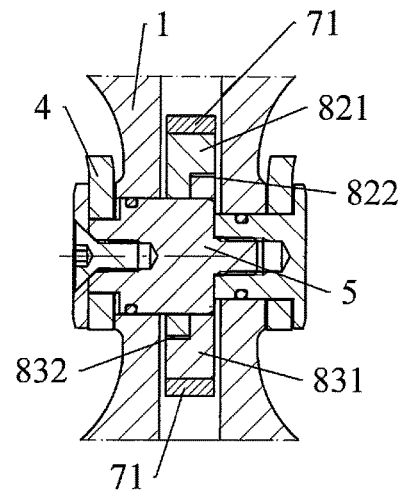
FIG.16  FIG.17
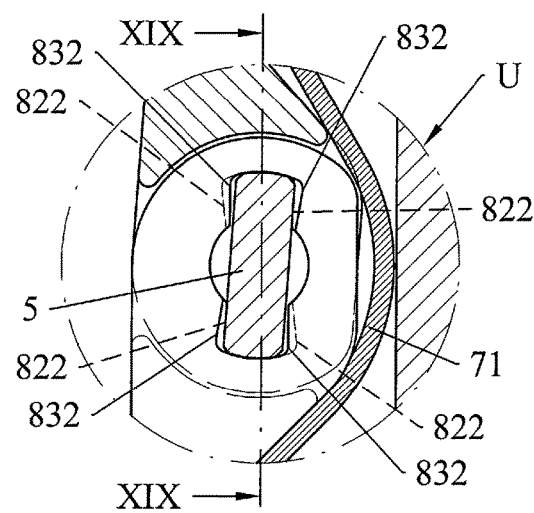
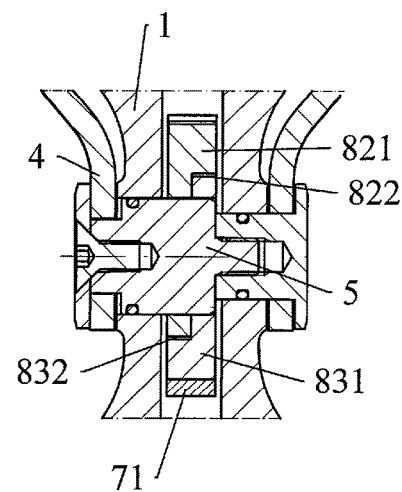
FIG.18  FIG.19

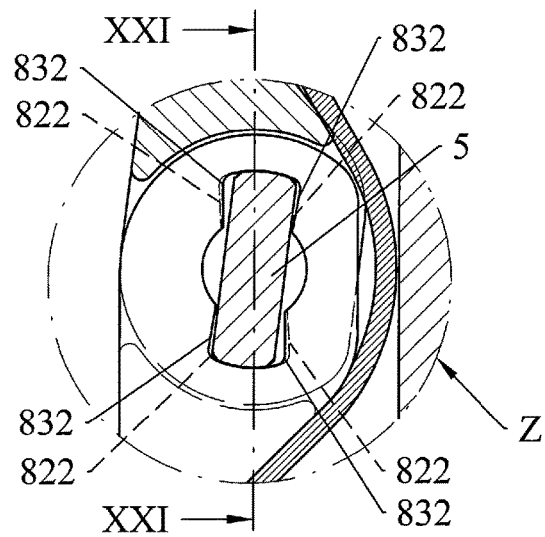
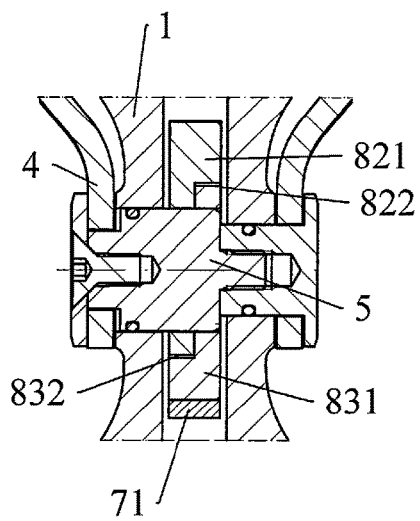
FIG.20  FIG.21
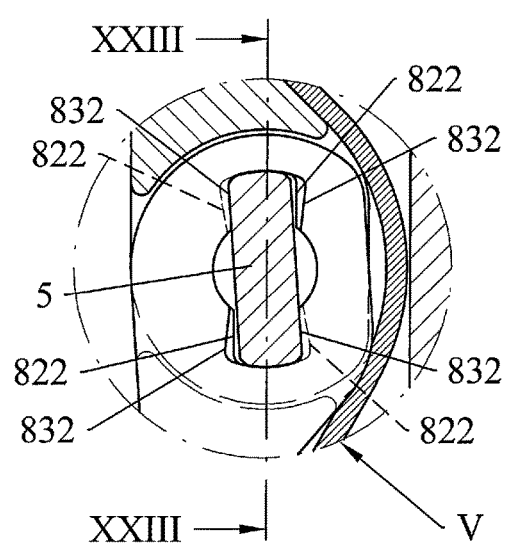
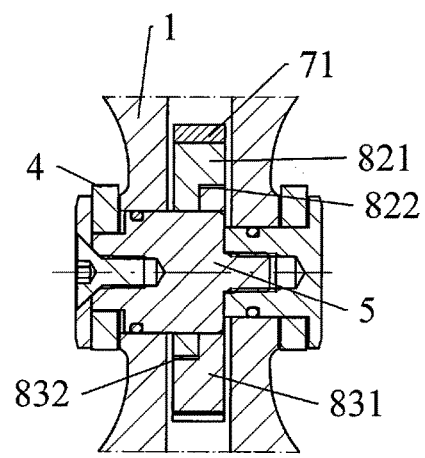
FIG.22  FIG.23

FLUID TRANSMISSION COUPLING WITH INDEPENDENT MEMBER PRESSURE RELIEVING CAM

BACKGROUND OF THE INVENTION

1. Technical Field

The present invention relates to a fluid transmission coupling with independent member pressure relieving cam.

2. Description of the Related Art

Fittings which may be rapidly coupled to one another to connect a fluid feed, by means of rigid pipes or flexible hoses, are frequently required for fluid transmission for example in operating machines and hydraulic equipment.

The known quick coupling fittings usually consist of two couplings, named male and female, which are fastened to respective pipes to be joined and which can be coupled together by screwing or by snapping.

The male and female couplers are formed by fixed parts and axially sliding parts, which at rest are arranged in a closing position of a fluid passage gap and during the coupling between two members are displaced by engaging with corresponding parts of the other member to an opening position of the passage gap.

The currently marketed fluid transmission solutions show that the coupling between the male coupler and the female coupler is not always very easy with effort increasing incrementally as the residual pressure present in the circuit increases.

Italian patent application MI2012A001254 by the present Applicant concerns a fluid transmission coupling connectable with constant effort provided with a pressure compensation and relief system which is complex and not very cost-effective. The known fitting further comprises a central locking system which is mechanically cumbersome and ineffective in some situations of accidental actuation by the user.

US Publication No. 2006/0273580 describes a pressurized fluid transmission fitting with pressure relief cam having a first member which acts on a first female coupler of a first hydraulic line, in one piece with the second member which acts on a second female coupler of a second hydraulic line. As the first and second members belong to one same piece, the approaching movement of the first member to the female coupler corresponds to the distancing of the second member from the second female coupler.

EP-0048822 shows a fluid transmission fitting with a cam with actuating members in one piece.

SUMMARY OF THE INVENTION

It is the object of the present invention to make a pipe fitting, in which the effort required for the coupling operation is minimum and independent from the residual pressure present in the circuit.

It is a further object of the present invention to make the fitting mechanically simpler and allow a suitable hydraulic control to guarantee user safety also in the event of accidental actuation.

It is a yet further object for the fitting to have a pressure relieving cam which allows the use of at least two pressurized lines in the same block of the fitting.

According to the present invention, such objects are achieved by means of a fluid transmission fitting as defined in the claims.

BRIEF DESCRIPTION OF THE DRAWINGS

The features of the present invention will be more apparent from the following detailed description of a non-limitative example thereof shown in the accompanying drawings, in which:

FIG. 16 is an enlarged detail view of the content of circle W in FIG. 1;

FIG. 17 is a section view taken along line XVII-XVII in FIG. 16;

FIG. 18 is an enlarged detail of the content of circle U in FIG. 2;

FIG. 19 is a section view taken along line XIX-XIX in FIG. 18;

FIG. 20 is an enlarged detail of the content of circle Z in FIG. 13;

FIG. 21 is a section view taken along line XXI-XXI in FIG. 20;

FIG. 22 is an enlarged detail of the content of circle V in FIG. 27;

FIG. 23 is a section view taken along line XXIII-XXIII in FIG. 22;

DETAILED DESCRIPTION OF THE INVENTION

Figure 1:
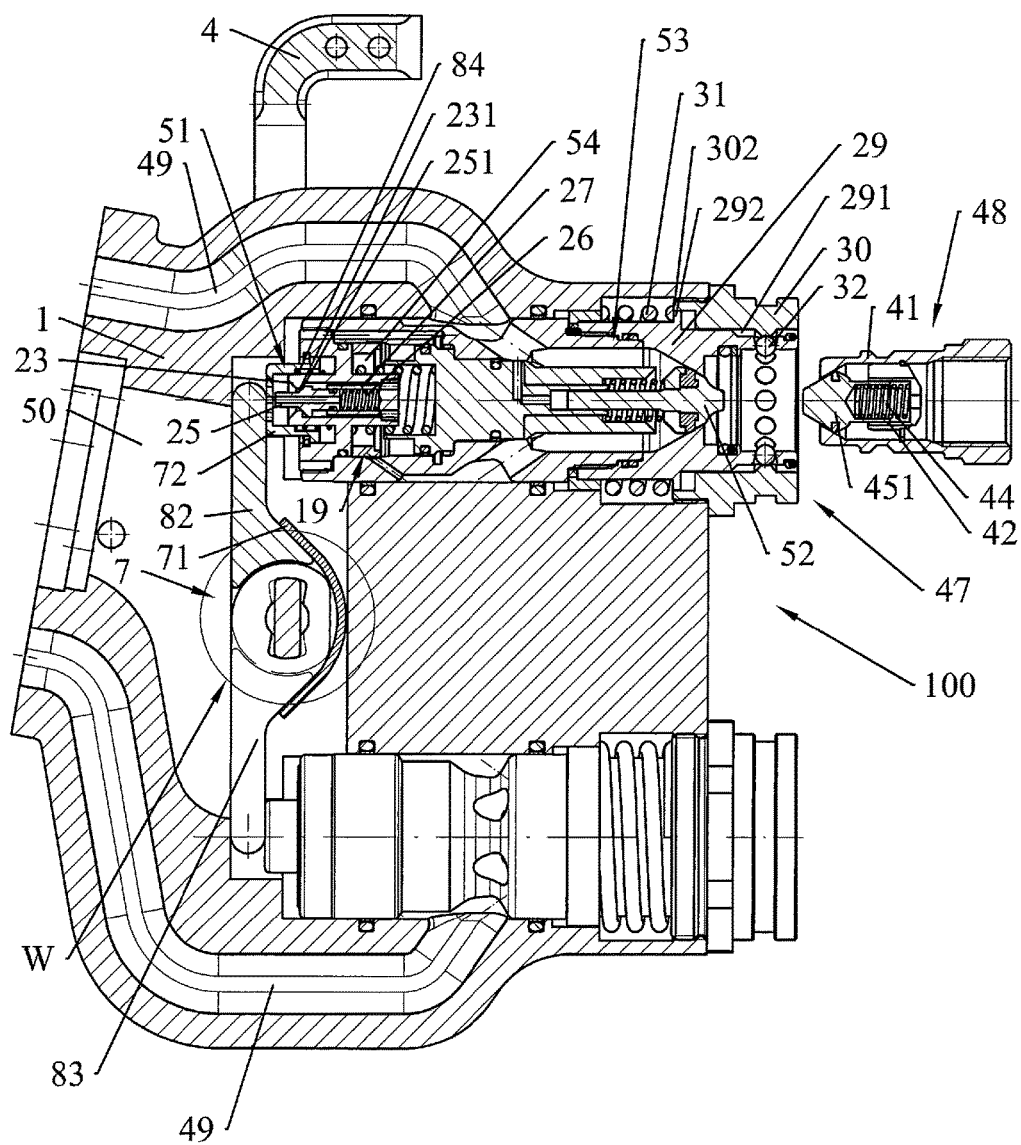
FIG. 1 is a section view taken along line I-I in FIG. 26 of a fluid transmission fitting with uncoupled male and female coupler.

FIG. 1 shows a coupling fitting 100 comprising a female valve coupler 47 inserted in a hydraulic feeding block 1 and a male valve coupler 48 which can be coupled to the female coupler 47.

The block 1, which feeds the fluid, comprises at least one hydraulic line 49 and a draining line 50, both interfacing with one or more female couplers 47.

In the description of the operation, reference will be made to only one male-female line (the one shown on the top in the drawings), but the considerations are applicable to all lines of a same fitting. It is worth noting that in the drawings the male-female coupler in the lower line is not shown in section but only as a view, the section being identical to that of the upper line.

The block 1 further comprises a lever 4 integral with a cam 7 adapted to relieve the pressure from a chamber 54 inside the female coupler 47, and adapted to uncouple the male coupler 48 from the female coupler 47.

The cam 7 consists of two independent parts, an upper one 82, which acts on the coupling of the upper hydraulic line, and a lower one 83, which acts on the coupling of the lower hydraulic line (FIG. 1).

The cams 82, 83 have one disc-shaped attachment portion 821, 831 (FIGS. 16-23) with a respective loop 822, 832 each.

The attachment portions 821, 831 are associated with a central shaft 5 controlled by the rotation of the lever 4, by means of the loops 822, 832 in which the central shaft 5 is housed with clearance.

The central shaft 5 has a substantially rectangular section 501 with rounded short sides (FIG. 16) so as to allow the rotation of the shaft 5 in the loops 822, 832.

The shape of the loops 822, 832 is similar to that of the shaft 5, but broader so as to allow the shaft 5 to move inside if it is not meshing with either one loop 822, 832 or the other, as will be more apparent below.

In actual fact, the loops 822, 832 are superimposed in axis with the rotation axis of the shaft 5.

The attachment portions 821, 831 may move one over the other, thus being reciprocally independent as their rotation is controlled only by the lever 4 by means of the shaft 5.

The rotation of the central shaft 5 is determined by applying stress to the lever 4, which moves the attachment portion 821 of the upper cam 82 clockwise, but being free in the second loop 832 it does not move the attachment portion 831 of the lower cam 83, and moves the attachment portion 831 of the lower cam 83 anticlockwise but by being free in the loop 822 it does not move the attachment portion 821 of the upper cam 82.

As already mentioned, the shape of the loops 822, 832 is substantially complementary to the shape of the central shaft 5, but their width is greater to allow a rotation clearance such to be able to move one cam 82 while maintaining the other 83 stationary, and vice versa, as will be more apparent below.

The cams 82, 83 are held in position by means of the spring 71, for example a C spring, but two compression springs may be provided. It is also possible to eliminate the spring 71 because cams 82, 83 are stressed by the shutter 25 and in all cases a slight clearance, which determines a minimal distancing from the ideal initial resting position, is tolerated (FIG. 1).

The female coupler 47 comprises a pressure relief valve which puts the chamber 54 into communication with the draining line 50 (FIG. 1).

The valve 51 comprises a valve body 23, which forms a housing for a sliding shutter 25, stressed by a spring 26, which reacts against a protrusion of the shutter 25 and a stop 27. Sealing is ensured by the contact between a conical surface 251 of the shutter 25 and an edge 231 of the valve body 23 (FIG. 1).

A cup 72 sliding in axial direction and pushed by the upper cam 82 against the opposite thrust of a spring 84 acts on the shutter 25. The upper cam 82 is always in contact with the cup 72, which is pushed by the spring 84 against the cam 82 in releasing position of the shutter 25. The cup 72 is thus moveable between an engaging position and a releasing position with the shutter 25.

The shutter 25 has therein a hole 252 (FIG. 2) for venting the air and a hydraulic thrust section reduced to a minimum. Such a hydraulic thrust section is determined by the interface diameter between the conical surface 251 of the shutter 25 and the valve body 23, and by the diameter of slightly smaller size of a rear part 263 of the shutter 25 on which a seal 28 acts. The described configuration of the shutter 25-valve body 23 coupling allows to minimize the actuation force of the shutter 25 itself in the presence of residual pressure present inside the chamber 54.

The female coupler 47 further comprises a valve 52 axially sliding inside an outer assembly 53 of the female coupler 47 itself, and a seal 19 adapted to generate a pressure difference between the hydraulic line 49 and the chamber 54.

Figure 2:
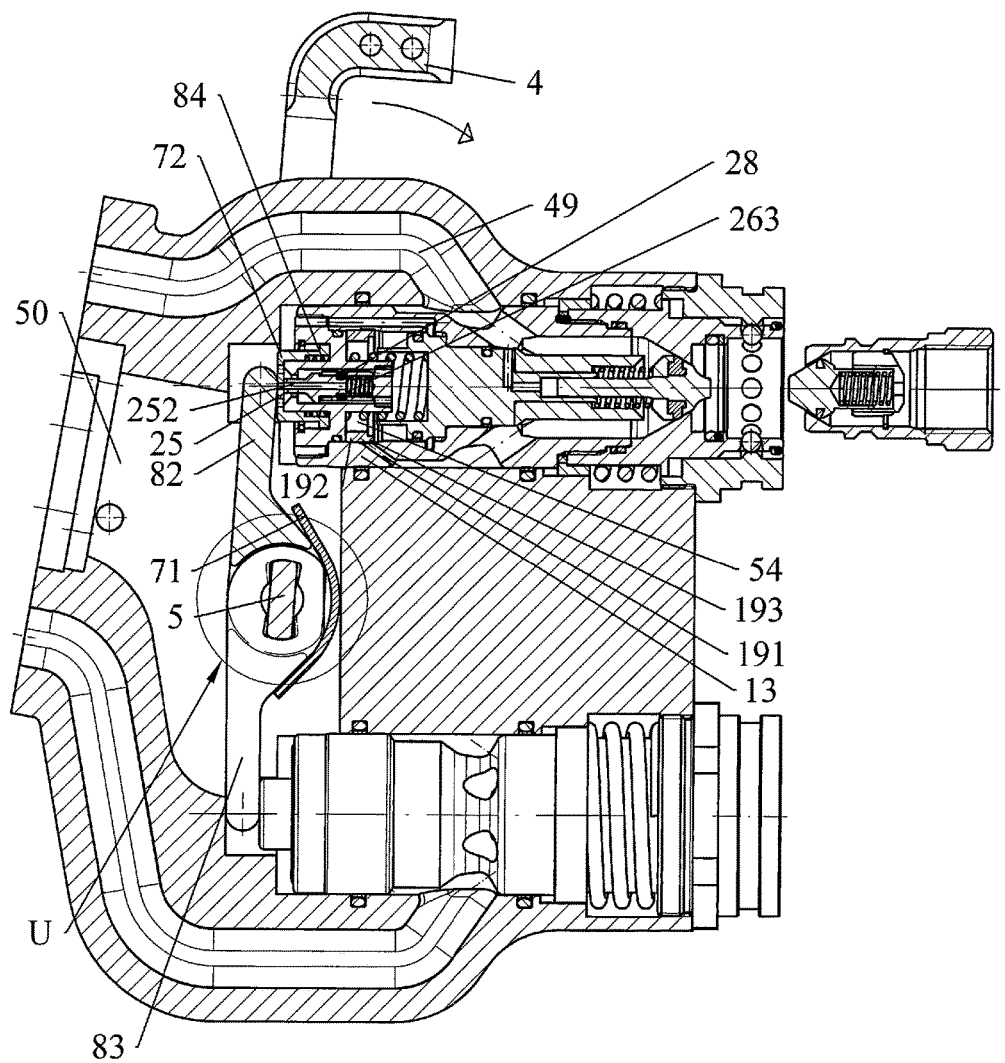
FIG. 2 is a section view similar to the one in FIG. 1 of the fitting in a step of relieving the residual pressure of the hydraulic line before the coupling between male coupler and female coupler.
Figure 3:
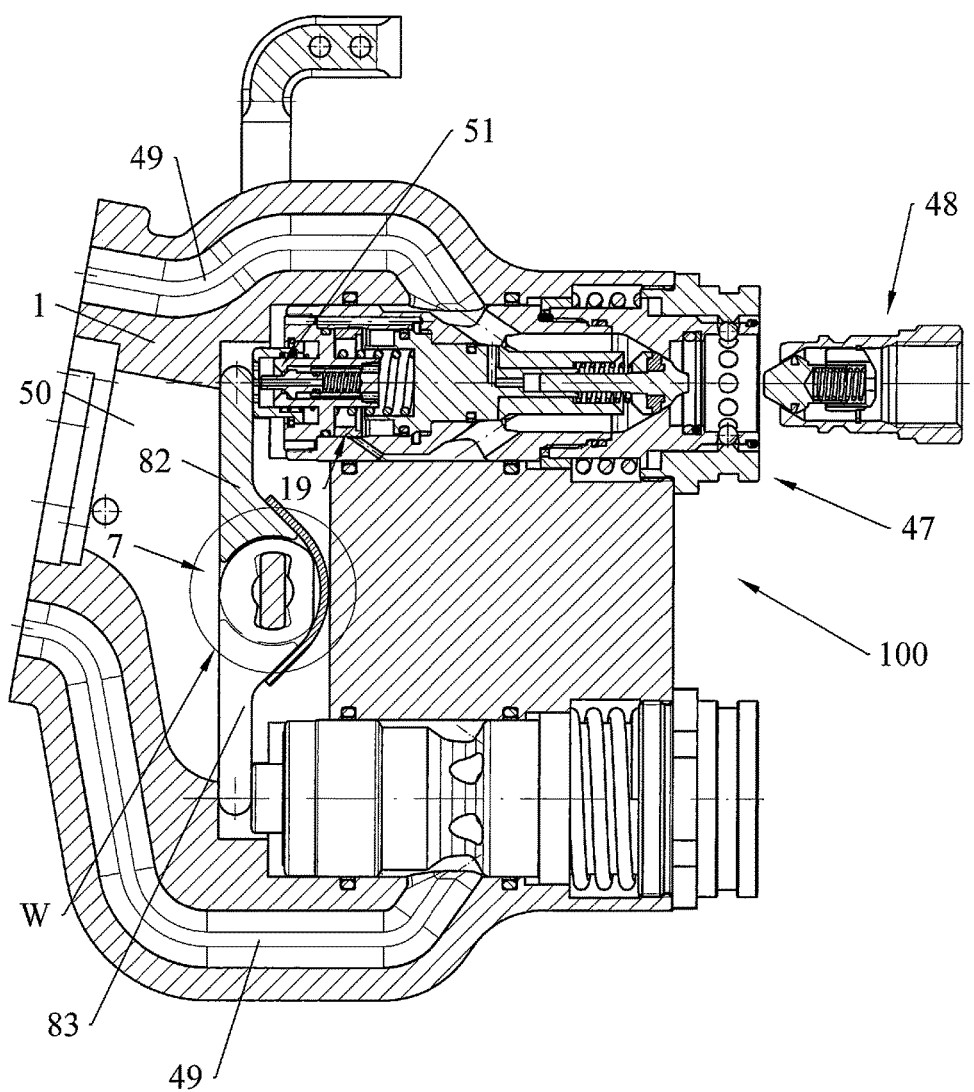
FIG. 3 is a section view similar to the one in FIG. 1 of the fitting before the coupling between male coupler and female coupler without the presence of residual pressure in the hydraulic line.

The seal 19 is adapted to close a calibrated communication pipe 191 between the chamber 54 and the hydraulic line 49 contained in an inner body 13 (FIG. 2).

The seal 19 is ring-shaped, determines a radial type sealing, i.e. orthogonal to the axis of the fitting 100, and comprises a non-deformable portion 192 and a deformable portion 193.

The pipe 191 is external to the chamber 54 and the pressurized fluid flow inside it insists radially outwards from the inside of the chamber 54 at the outer surface of the seal 19.

When a given nominal pressure is reached, the deformable portion 193 bends towards the inside of the chamber 54 thus determining the introduction of pressurized fluid into the chamber 54 of the hydraulic line 49. When the pressure returns under the nominal pressure, the deformable portion 193 returns to its initial position thus obstructing the passage of fluid.

The seal 19 can be used with identical operating principle also in case of flat-faced male-female couplers.

The outer assembly 53 (FIG. 1) comprises a ring nut holder 29, a ring nut 30 and at least one locking ball 32 arranged inside a housing of the ring nut holder 29. A spring 31, by reacting against appropriate protrusions 292, 302, against the ring nut 30, the ring nut holder 29 and the block 1, constrains the outer assembly 53 in a central resting position which guarantees the locking of the male coupler 48 after the coupling.

A bottom 16 also slides inside the female coupler 47 and has two seals 14 and 17 (FIG. 9) on the side of the hydraulic line 49 and on that of the chamber 54, respectively. The zone comprised between the two seals 14, 17 is in contact with the draining line 50 by means of the pipe 56. The bottom is held in position by a spring 22.

The male coupler 48 is shown, in turn, in FIG. 1 and comprises a threaded male body 41 for connecting to a user (not shown), e.g. to a hydraulic equipment. There is a valve 451 held in position by a spring 44 which acts on a bottom 42 within the male body 41. Such a valve 451 guarantees the sealing of the male coupler 48 in uncoupled condition.

Residual pressure may be present in one or more of the hydraulic lines 49 in operation. Starting from the configuration in FIG. 1 in which the upper cam 82 and the lower cam 83 are in resting position, i.e. do not act on the couplings, the lever 4 moves rightwards and actuates the upper cam 82, which pushes the cup 72 towards the shutter 25 putting the hydraulic line 49 into connection with the draining line 50 and allowing to relieve the inner residual pressure (FIG. 2). During such a function, the seal 19 is radially deformed at the deformable portion 193 allowing the passage of fluid through the pipe 191.

During this step, the lower cam 83 does not move because the shaft 5 by rotating rightwards meets a side of the loop 822 of the upper cam 82 feeding it, while the loop 832 of the attachment portion 831 is sufficiently wide to make the shaft 5 rotate without touching any of its sides (FIGS. 18-19). In practice, the attachment portion 821 of the upper cam 82 rotates on the attachment portion 831 of the lower cam 83. The upper cam 82 thus moves independently from the lower cam 83.

The force applied by the lever 4 must be such to overcome the resistance of the spring 71, which in all cases holds the lower cam 83 in position.

Having relieved the residual pressure inside the line 49, the system is ready for coupling.

Figure 4:
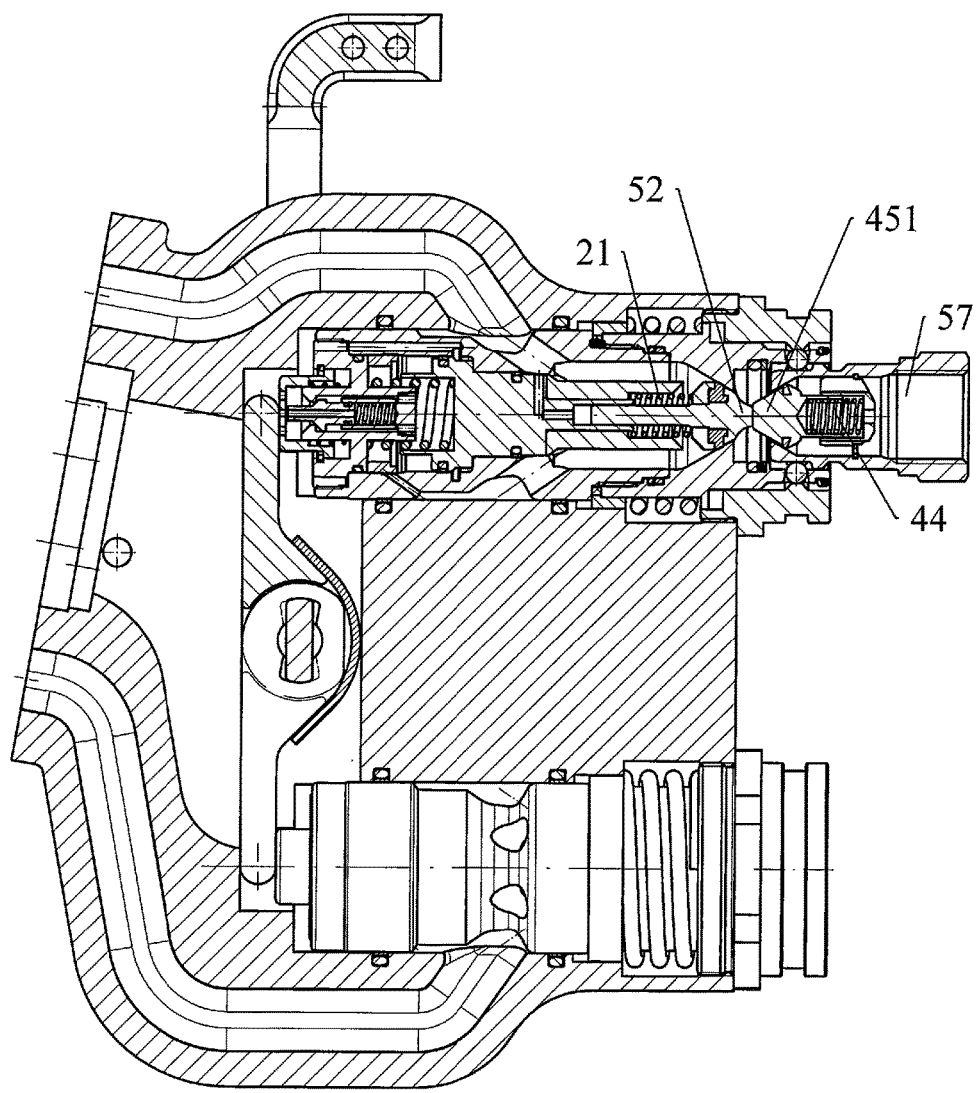
FIG. 4 is a section view similar to the one in FIG. 1 of the fitting in a first step of coupling between male coupler and female coupler, with contact of a valve of the male coupler and a valve of the female coupler.
Figure 5:
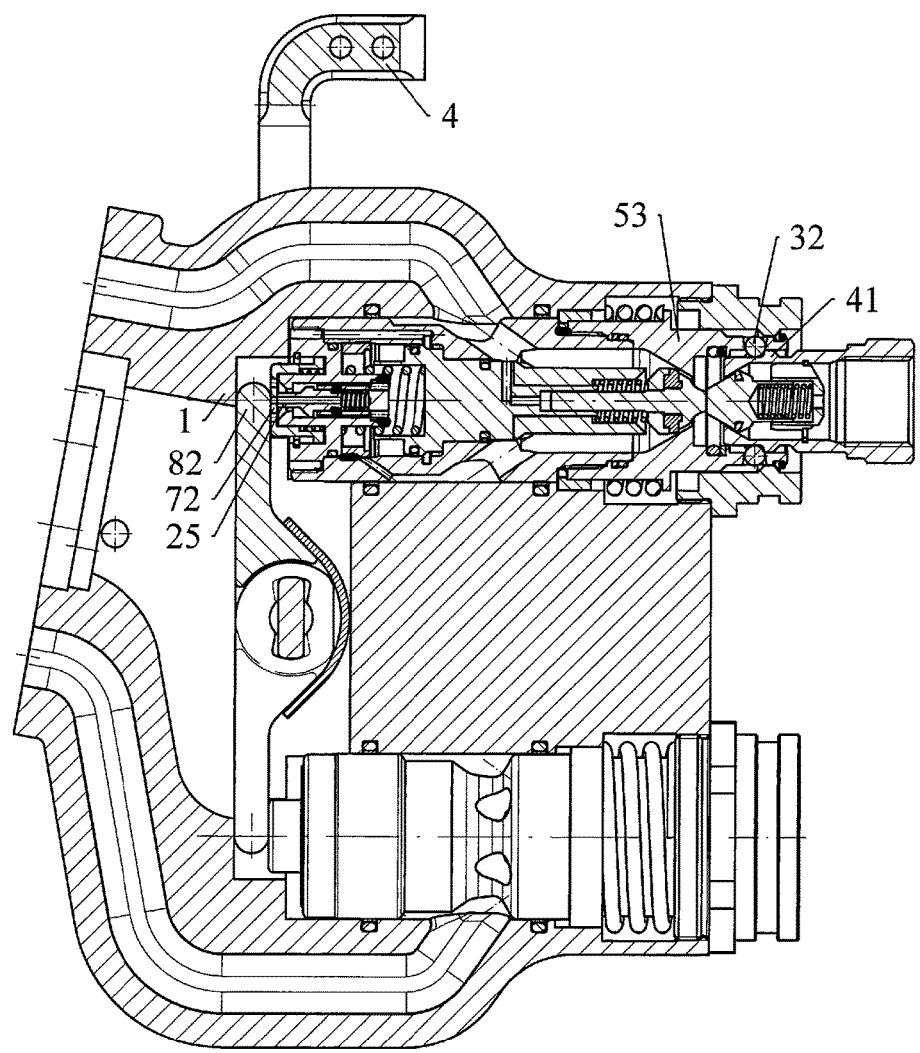
FIG. 5 is a section view similar to that in FIG. 1 of the fitting in a second step of coupling between male coupler and female coupler, with displacement of the inner part of the female coupler in the hydraulic feeding block and opening of the rear pressure relief.

The first coupling step (FIG. 4) consists in pushing the male coupler 48 into the female coupler 47. Residual pressure may be present in the chamber 57 upstream of the valve 451. The valve 451 comes into contact with the valve 52 by approaching the male coupler 48 to the female coupler 47. In absence of residual pressure in the chamber 57, the load of the springs 21 and 44 is equivalent and both valves 451, 52 are displaced. Only valve 52 is displaced in case of pressure in the chamber 57. By pushing the male coupler 48 into the female coupler 47, the male body 41 goes into contact with the balls 32, thus displacing the outer assembly 53 into the block 1 (FIG. 5). During the displacement, the shutter 25 goes into contact with the cup 72 and the upper cam 82, in turn, goes into contact with the block 1. Thus, the shutter 25 opens and turns the hydraulic line 49 into an open circuit. This function allows to relieve the pressure during coupling even if the lever 4 is not operated in advance. The upper cam 82 is not free to move with the shutter 25 in the opening position.

Figure 6:
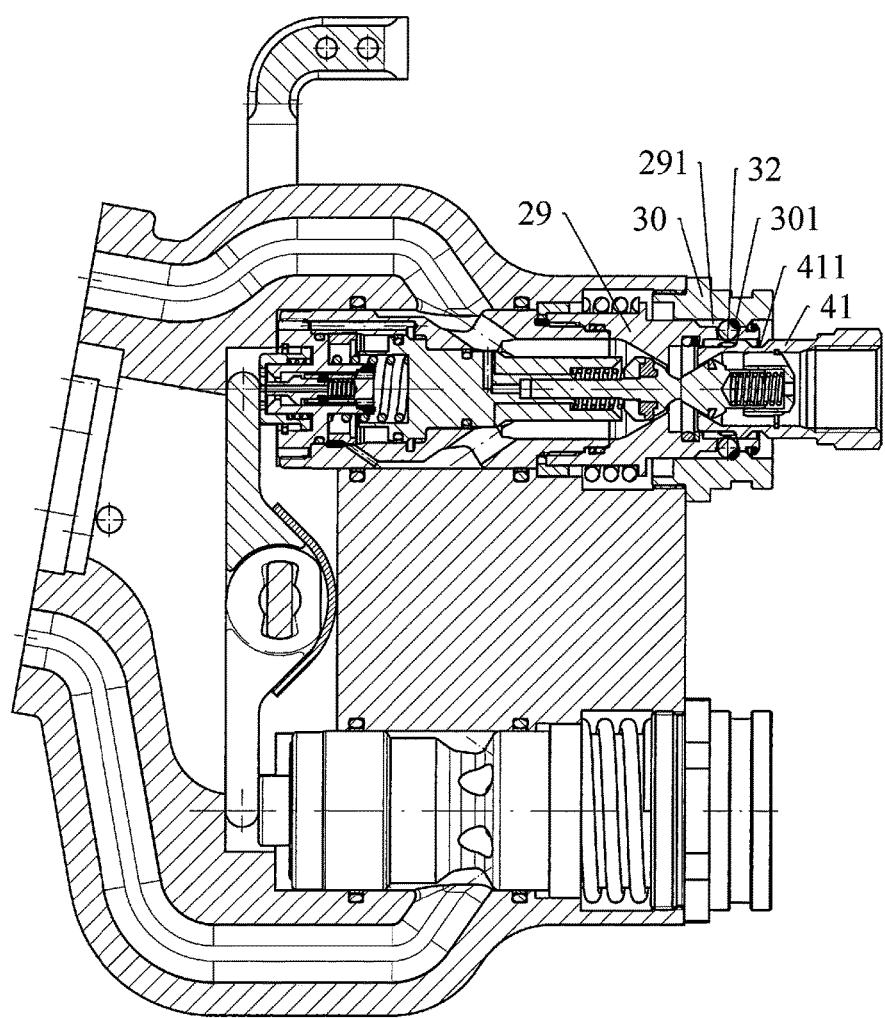
FIGS. 6 and 7 are two section views similar to the view in FIG. 1 of the fitting in a third and a fourth step of coupling between male coupler and female coupler with radial displacement of the locking balls of the female coupler in the housing of a fixing ring nut.
Figure 7:
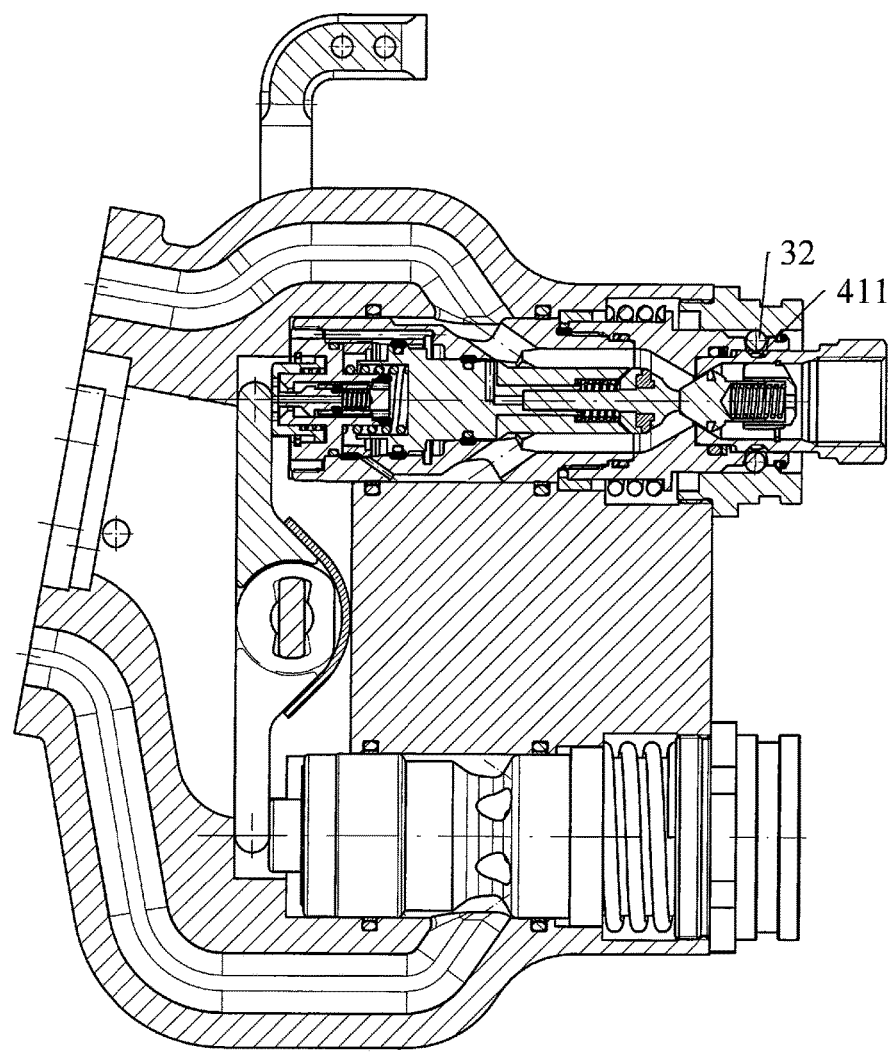
Figure 8:
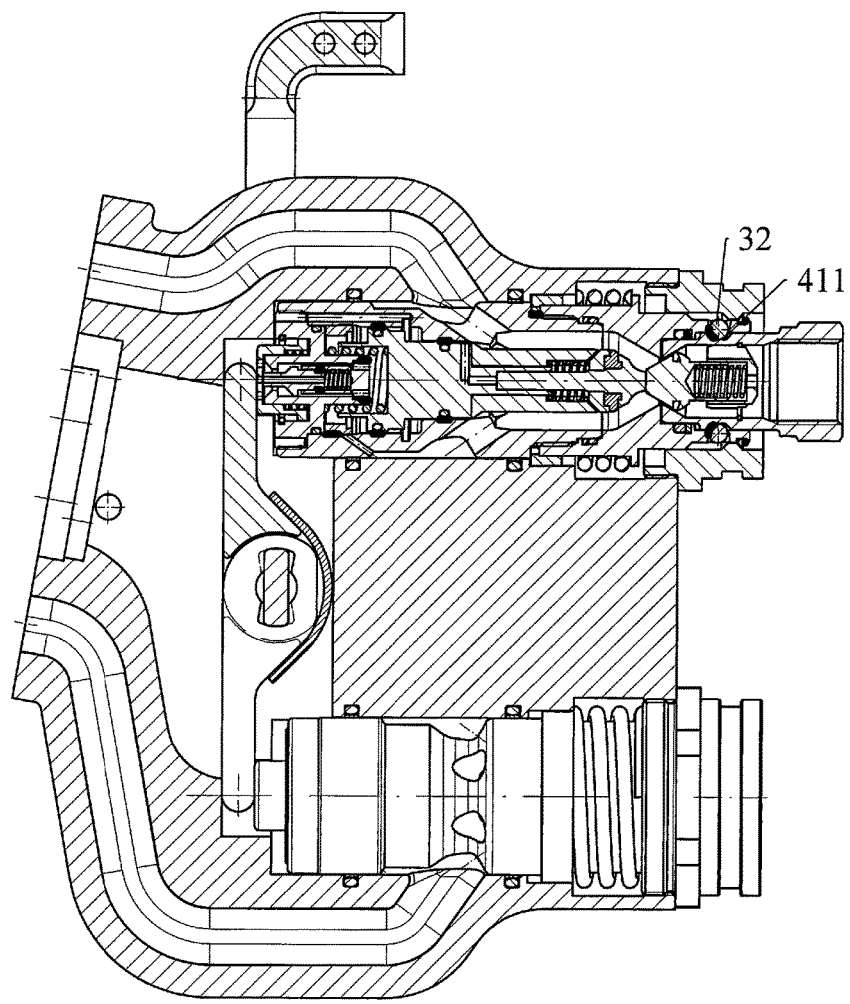
FIG. 8 is a similar view to the one in FIG. 1 of the fitting in a fifth step of coupling between male coupler and female coupler, with positioning of the locking balls within a recess present on the male body.
Figure 9:
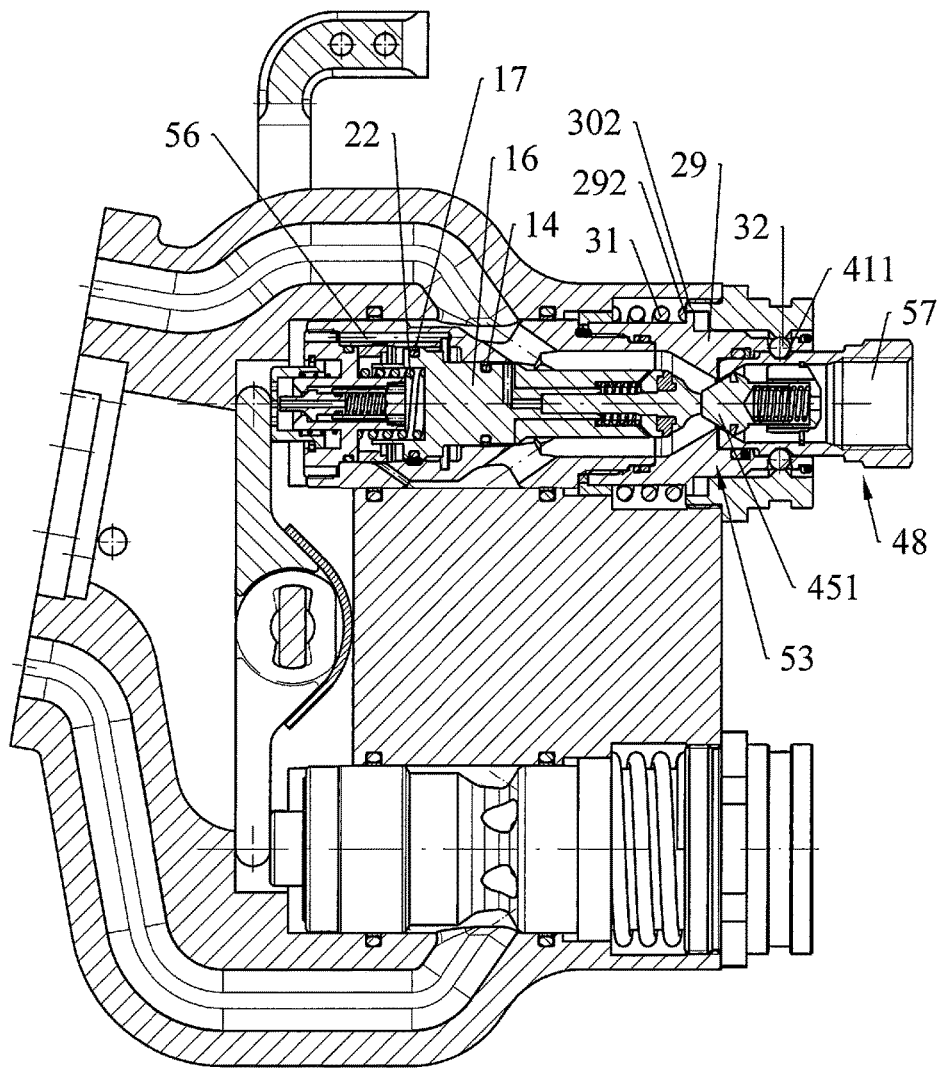
FIG. 9 is a similar view to the one in FIG. 1 of the fitting in a sixth step of coupling between male coupler and female coupler, with displacement of the outer assembly with locking balls to the locking position of the male coupler.

Proceeding with the insertion of the male coupler 48 in the female coupler 47 (FIGS. 6-7), the locking balls 32 enter into the seat 301 of the ring nut 30 thus allowing the entrance of the male coupler 48 until the locking balls 32 fall into the cavity 411 obtained in the male body 41 (FIGS. 8-9).

Figure 10:
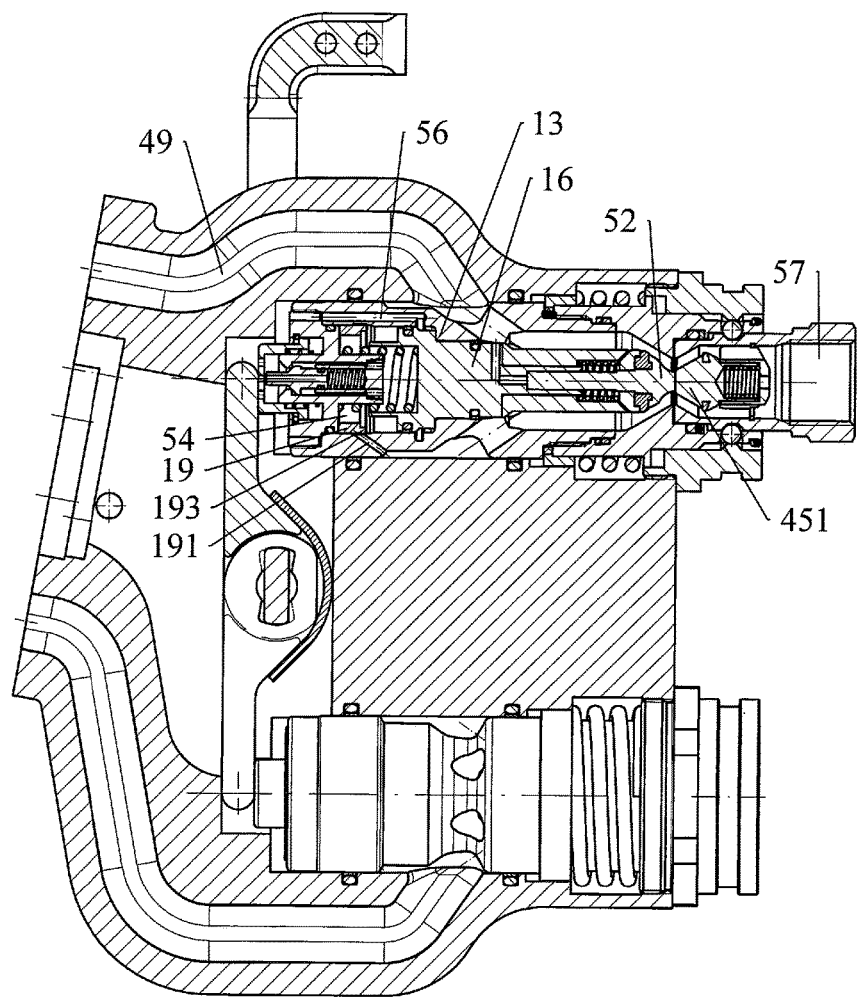
FIG. 10 is a section view similar to the one in FIG. 1 of the fitting in a seventh step of coupling between male coupler and female coupler, with opening of the male valve by effect of the hydraulic thrust caused by the feeding of the circuit.

In this position, the spring 31 returns the assembly consisting of the outer assembly 53 and the male coupler 48 to the coupled balanced position by working on the shoulder 292 of the lock ring holder 29 (FIG. 9). In case of absence of pressure in the chamber 57, as mentioned above, the bottom 16 is not moved and is held in position by the spring 22, and the valve 451 is retracted; in this case the circuit is open and the coupler is coupled as shown in FIG. 10.

The bottom 16 retracts instead in case of pressure in the chamber 57.

The manual mechanical coupling operation is complete at this point; the male coupler 48 is mechanically coupled to the female coupler 47, but by virtue of the fact that the bottom 16 was moved towards the inside of the female coupler 47, the valve 451, which retains the residual pressure of the male coupler 48, is still not open. Thus, the effort required for the coupling operation is independent from the residual pressure present inside the male coupler 48 because it does not work on the valves which retain the residual pressure.

For opening the valve 451, in case of pressure in the chamber 57, it is necessary to send a pressure pulse from the hydraulic line 49, which by passing through the pipe 191 deforms the deformable portion 193 of the seal 19, fills the chamber 54 and pushes the bottom 16 which acts on the valve 52, which opens the valve 451, the thrust section of the bottom 16 being higher than that of the valve 451. During the movement of the bottom 16, the air contained in the zone between the seals 14 and 17 may enter and exit through the pipe 56 (FIG. 10).

The circuit totally opens when the bottom 16 abuts on the inner body 13 (again in FIG. 10). In this position, the chamber 54 remains full of oil and pressurized, and no longer allows the movement of the bottom 16 except for a movement of the shutter 25 because the seal 19 does not allow the return of fluid towards the hydraulic line 49.

Figure 11:
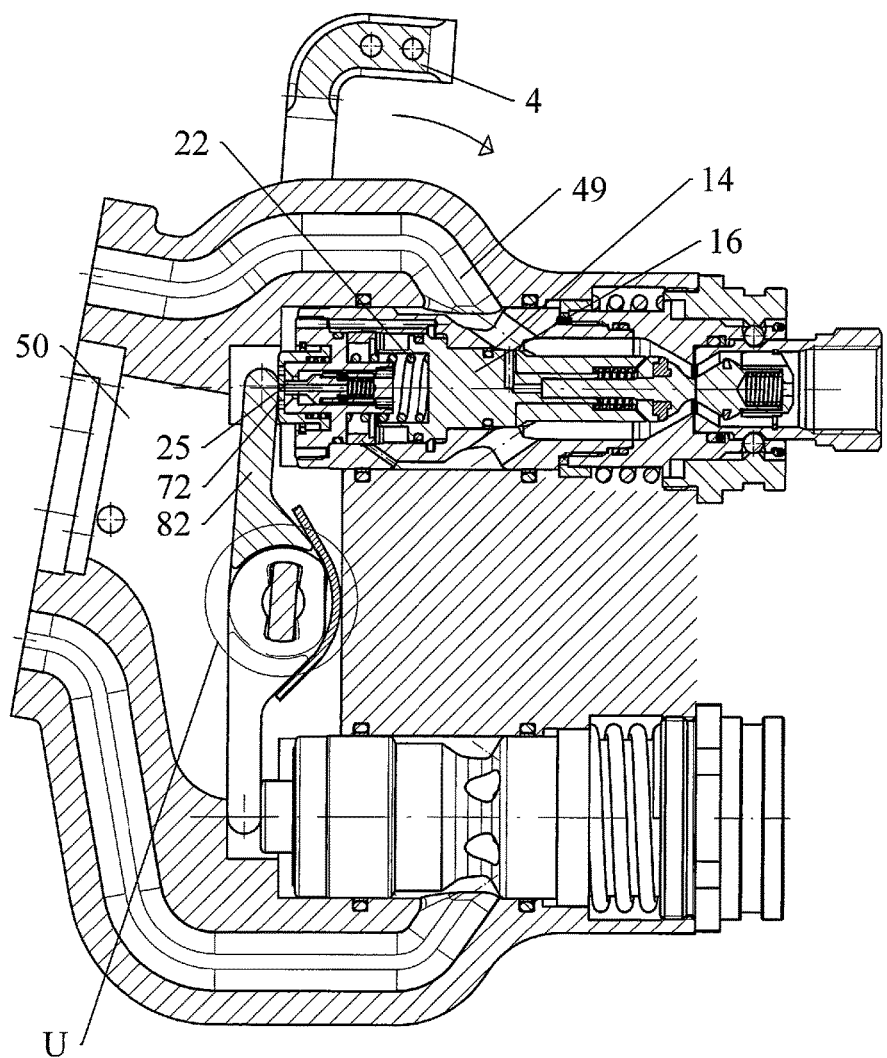
FIGS. 11 and 12 are section views similar to the ones in FIG. 1 of the fitting in a first and a second step of uncoupling between male coupler and female coupler, with pressure relief and closing of the male valve.
Figure 12:
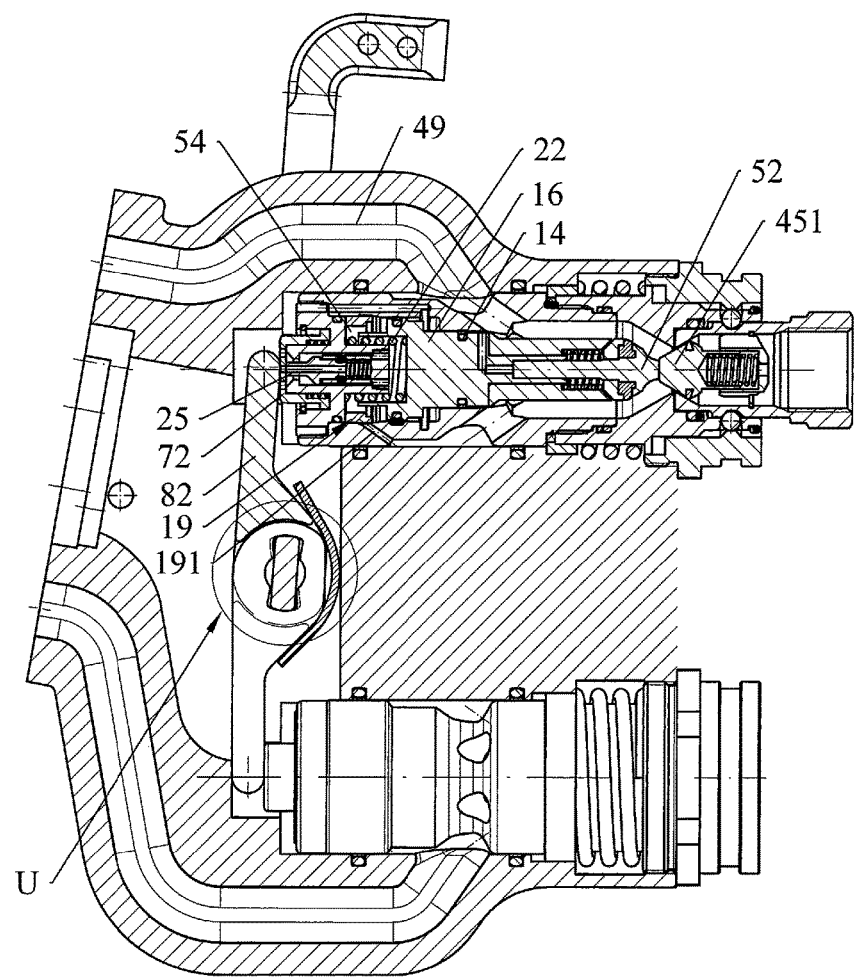

The uncoupling between male coupler 48 and female coupler 47 starts by acting on the lever 4 (FIG. 11) which moves the upper cam 82, according to the same methods as the initial relieving described above and as shown in FIGS. 2, 18 and 19, which acts on the shutter 25 by means of the cup 72 putting the hydraulic line 49 into communication with the draining line 50, thus discharging the pressure inside them. In case of pressure and possible flow in the hydraulic line 49 (e.g. caused by a load applied upstream of the male coupler), by actuating the shutter 25 there is a drop of pressure in the chamber 54, while the presence of the seal 19 and of the calibrated pipe 191 causes a higher pressure in the hydraulic line 49, which acts on the seal 14 causing a thrust on the bottom 16, which overcomes the spring 22 and thus moves the bottom 16 itself, the valve 52 and the valve 451 which close (FIG. 12).

Figure 13:
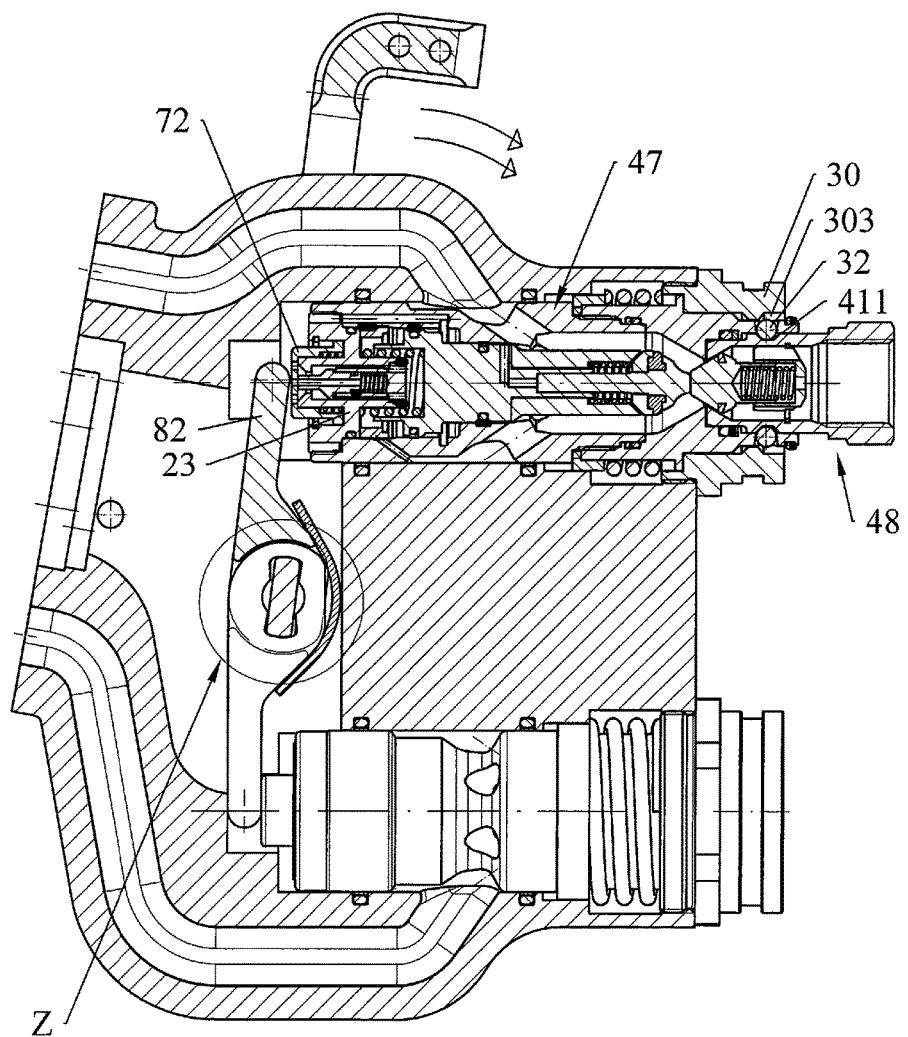
FIG. 13 is a section view similar to the one in FIG. 1 of the fitting in a third step of uncoupling between male coupler and female coupler, with displacement of the inner parts until the locking balls are released.
Figure 14:
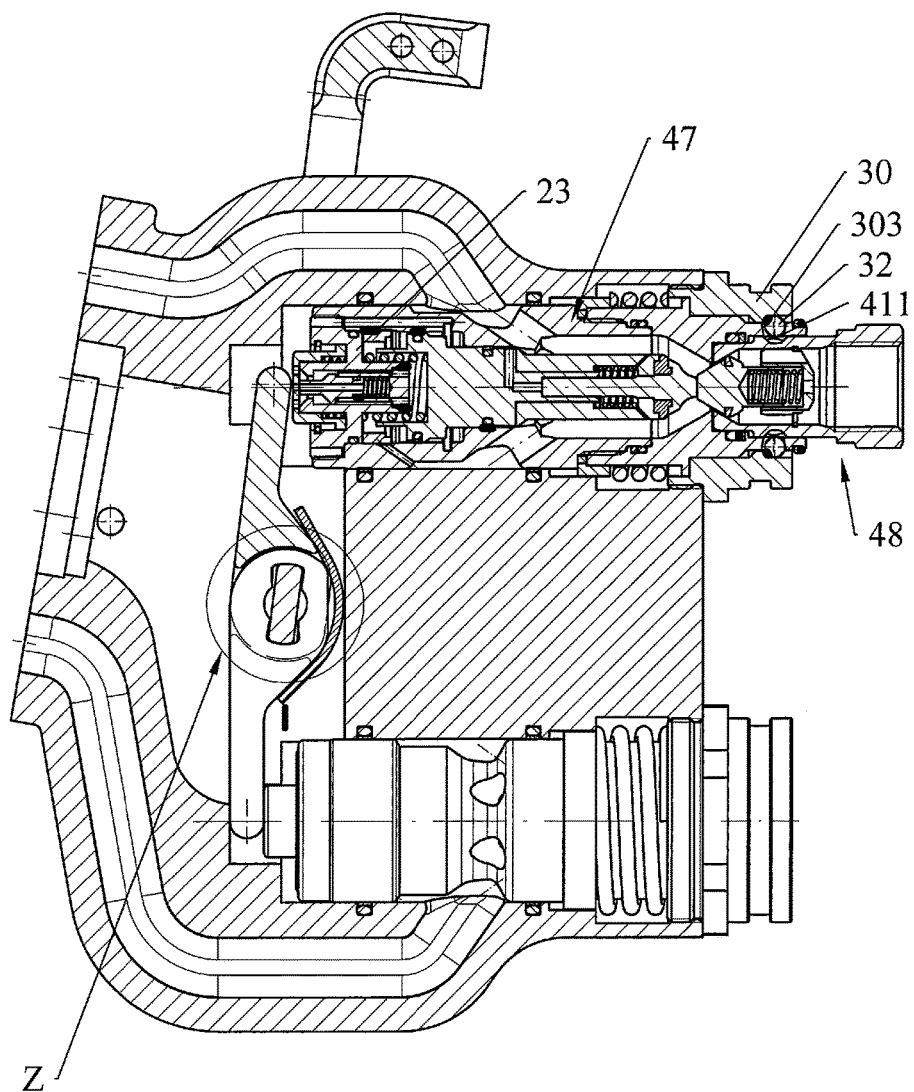
FIG. 14 is a section view similar to the one in FIG. 1 of the fitting in a fourth step of uncoupling between male coupler and female coupler, with releasing of the male coupler.

Continuing the movement, the upper cam 82 pushes the cup 72 to act on the valve body 23, which in turn moves the whole formed by female coupler 47 and male coupler 48 outwards of the locking balls 32 with the recess 303 on the fixing ring nut 30. In such a position, the locking balls 32 exit from the recess 411 in the male body 41 and release it letting it out (FIGS. 13-14).

It is worth noting that the loop 832 of the lower cam 83 is sufficiently wide to allow a double movement of the upper cam 82 at the end of the second movement, the shaft 5 nearly abutting onto a side of the loop 832 (FIGS. 20-21). Thus, the upper cam 82 rotates by a predetermined angle according to the shape of the loop 832, and vice versa, as will be more apparent below, the lower cam 83 rotates in opposite sense by a predetermined angle according to the shape of the loop 822.

Figure 15:
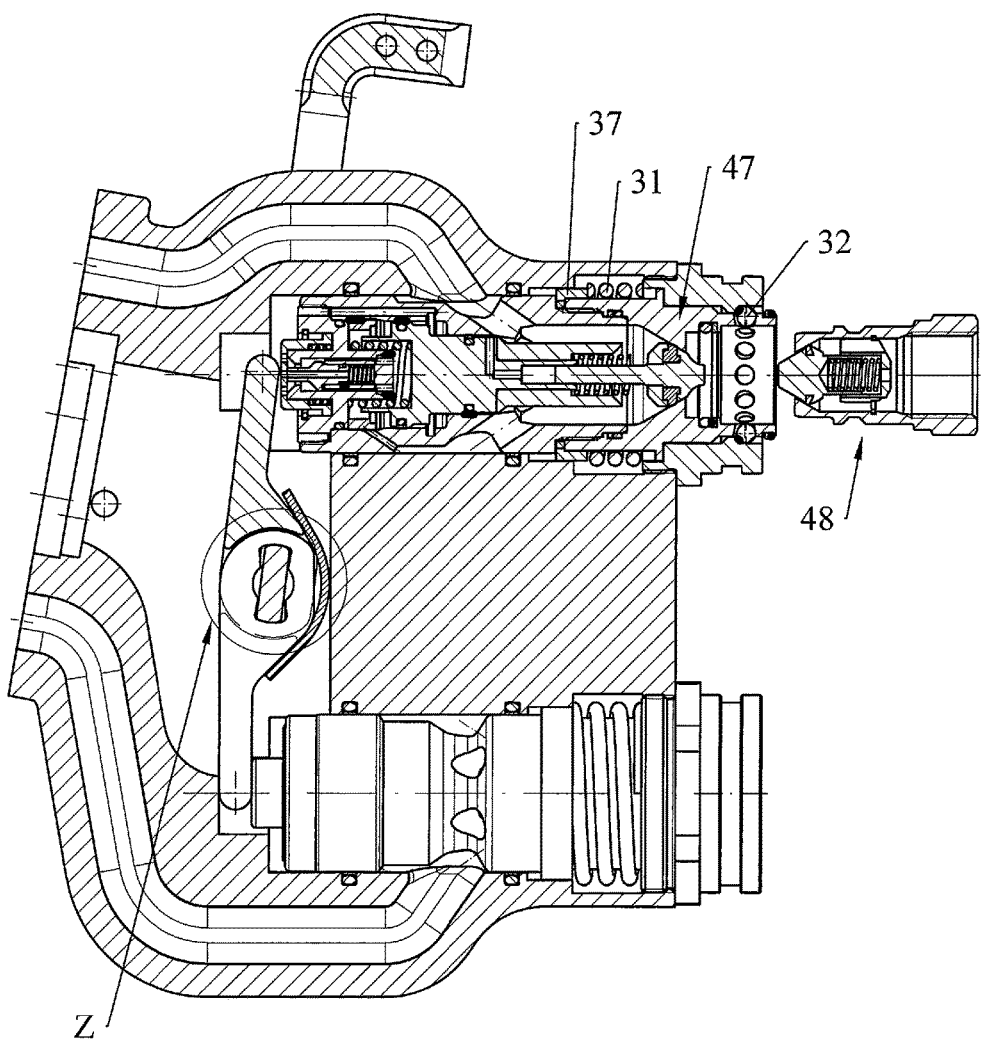
FIG. 15 is a section view similar to the one in FIG. 1 of the fitting, with male coupler and female coupler uncoupled.

The unrestrained male coupler 48 is uncoupled by effect of the thrust of the inner springs. Having released the balls 32, the spring 31 returns the female coupler 47 to the resting position by working on the ring 37 (FIGS. 1 and 15).

The system is ready for a new connection.

The female coupler 47 coupled by means of the locking balls 32 is fed outwards when coupled, if the male coupler 48 is pulled. When the locking balls 32 reach the recess 303 of the ring nut 30, the male coupler 48 is uncoupled (accidental uncoupling, "breakaway" function).

Figure 27:
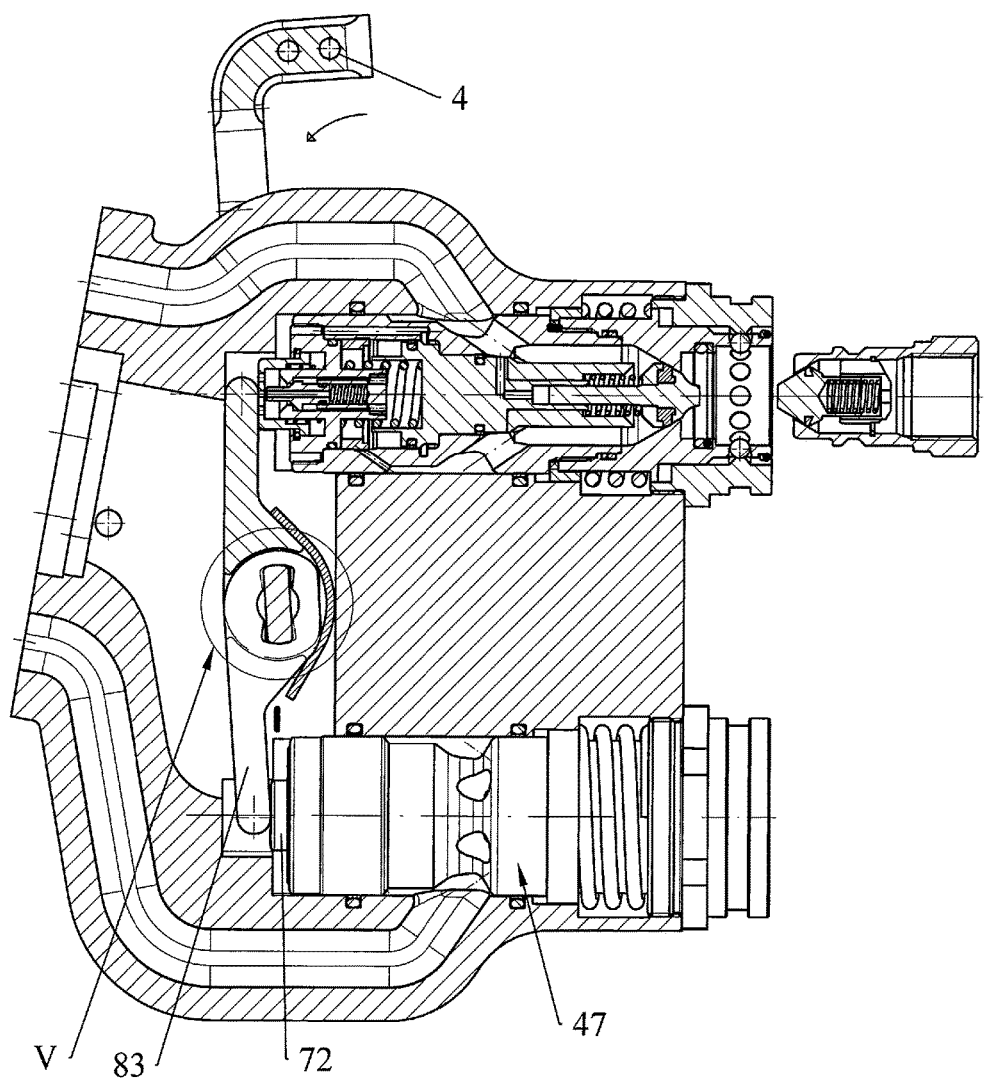
FIG. 27 is a section view similar to the one in FIG. 1 of the fitting in a step of relieving the residual pressure before the coupling between male coupler and female coupler of the lower hydraulic line.

The engagement of the lower line is similar to that of the upper line, it being worth noting that the lever 4 moves leftwards in opposite sense (FIG. 27) starting from the central resting position shown in FIG. 16 (FIG. 27): the interaction between the shaft 5 and the attachment portion 831 of the lower cam 83 is similar to that described above for the attachment portion 821 of the upper cam 82, in which the loop 822 allows the rotation of the attachment portion 831 of the lower cam 83 without moving the upper cam 82.

Figure 24:
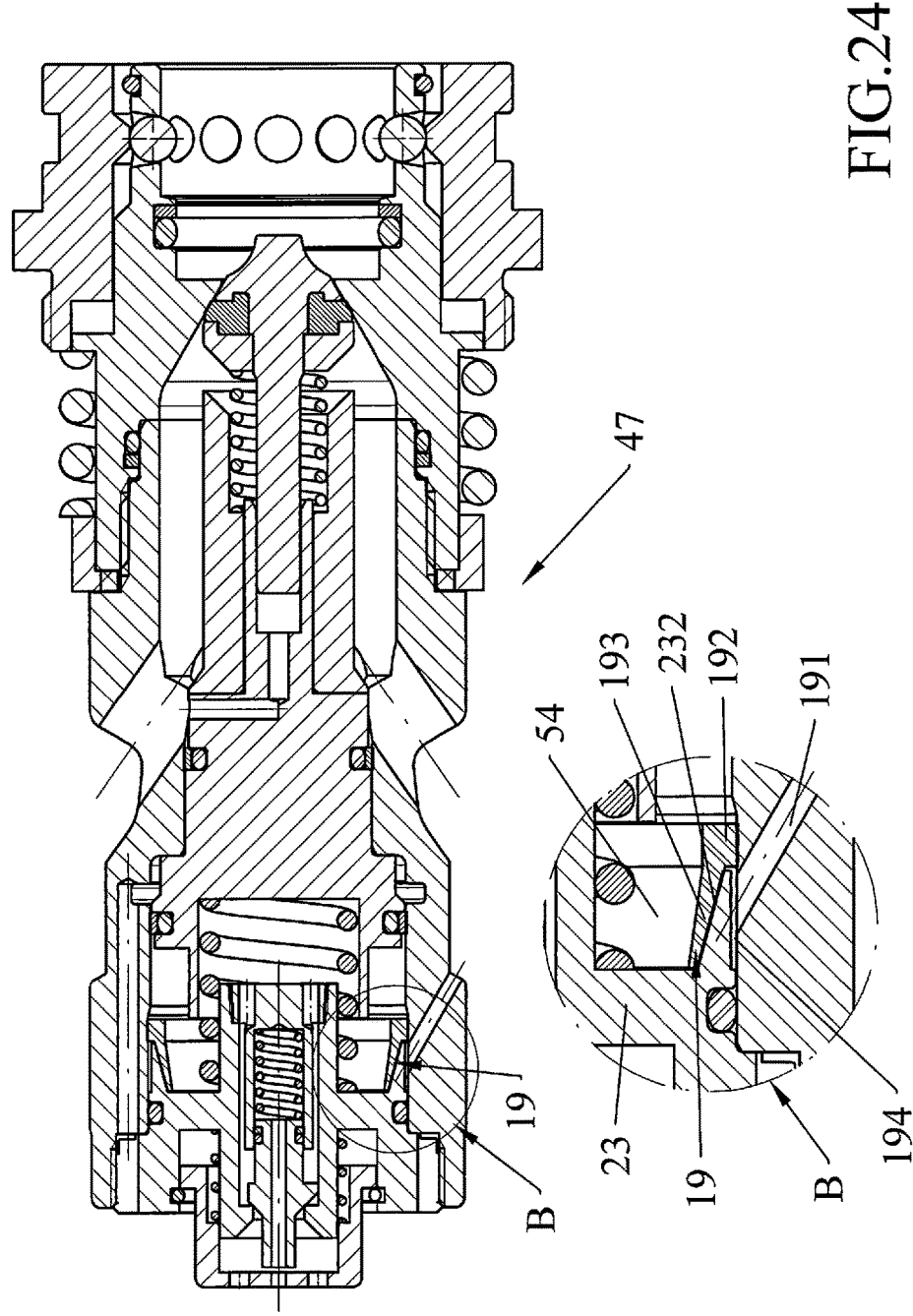
FIG. 24 is a section view similar to the one in FIG. 1, of a female coupler with a radial seal, also shown enlarged in circle B in accordance with a further embodiment.
Figure 25:
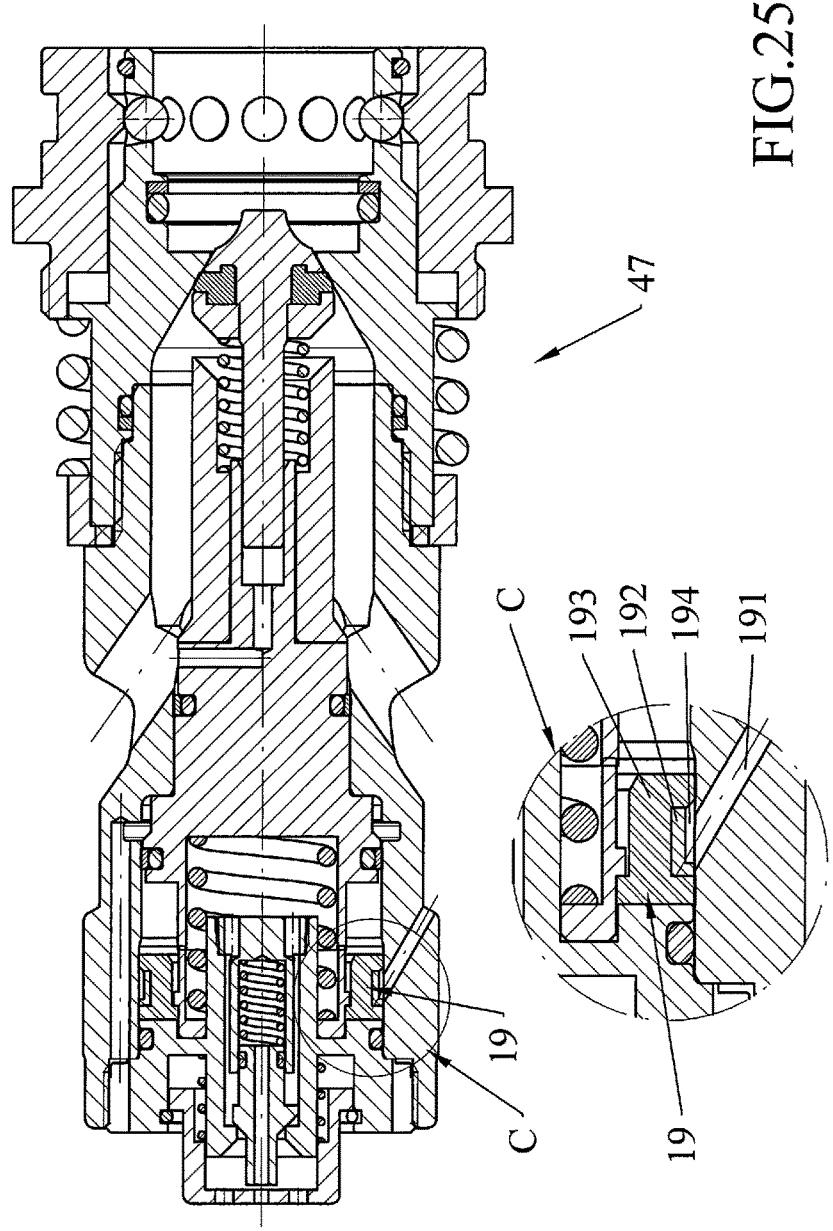
FIG. 25 is a section view similar to the one in FIG. 1, of a female coupler with a radial seal, also shown enlarged in circle C in accordance with a yet further embodiment.
Figure 26:
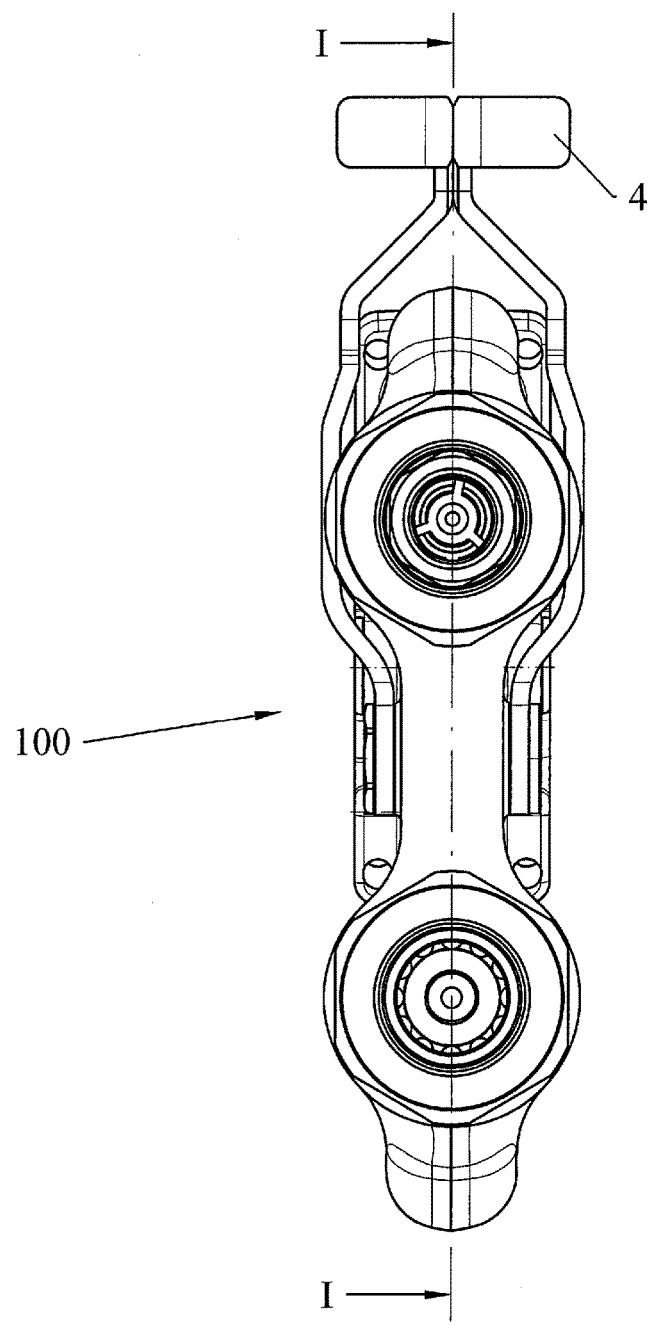
FIG. 26 is a front view of the fitting according to the present invention.

FIGS. 24-25 show female couplers 47 with seals 19 according to two further embodiments.

The seal 19 in FIG. 24 is not placed directly on the mouth of the pipe 191, there being provided an annular gap 194 obtained on the valve body 23 which allows to limit the wear of the seal 19 itself, which again includes a non-deformable portion 192 and a deformable portion 193.

The gap 194 allows to direct the pressurized flow exiting from the mouth of the pipe 191 firstly towards the non-deformable portion 192, then onto the deformable portion 193, on both sides of the mouth of the pipe 191.

The deformable portion 193 has a reduced thickness with respect to the non-deformable portion 192, which is further reduced by moving away from the non-deformable portion 192. When there is pressure in the chamber 54, the deformable portion 193 presses on a conical surface 232 of the valve body 23. When there is no pressure in the chamber 54, the pressurized fluid in the hydraulic line 49 bends the deformable portion 193 inwards starting from the most distant part from the non-deformable portion 192.

The seal 19 in FIG. 25 instead includes the non-deformable portion 192 made of more rigid material directly on the mouth of the pipe 191.

The non-deformable portion 192 has an L-shaped section and is adapted to direct the pressurized fluid coming from the pipe 191 towards the deformable portion 193 which does not face the mouth of the pipe 191 directly. As is apparent in the enlarged view shown in circle C, the L is rotated by 90° clockwise to form an annular gap 194 also in this case: the short part of the L closes an end of the mouth of the pipe 191, while the longer part of the L of the pipe 191, directs the pressurized fluid towards the deformable portion 193 of the seal 19.

Consequently, the wear of the seal 19 is limited also in this second embodiment which indeed derives from the direct interaction between the mouth of the pipe 191 and the deformable portion 193 of the seal 192, which is excluded in this manner.

The invention claimed is:

1. A fluid transmission coupling assembly comprising:
   a hydraulic feeding block;
   at least two female couplers inserted in the hydraulic feeding block; and
   at least two male couplers adapted to be coupled with the at least two female couplers, respectively,
   the block including at least two hydraulic lines and at least one draining line, and a lever integral with a cam adapted to relieve pressure from a chamber inside each female coupler and adapted to uncouple the male coupler from the female coupler,
   each female coupler comprising a pressure relief valve which puts the chamber into communication with the draining line,
   the cam comprising a first member, which acts on the female coupler of a first of the at least two hydraulic lines, and a second member, which acts on the female coupler of a second of the at least two hydraulic lines, wherein:
   the first member and the second member are independently and selectively movable between an operating position on the first hydraulic line and the second hydraulic line, respectively, by the lever adapted to be rotated in opposite directions,
   the first member and the second member have a first and a second disc-shaped attachment portion with a first and a second loop, respectively,
   the attachment portions are associated with a central shaft controlled by rotation of the lever, the central shaft is adapted to be selectively moved in opposite directions into the respective loop selectively engaging the respective attachment portion.

2. The fluid transmission coupling assembly according to claim 1, wherein the central shaft has a rectangular section which has rounded short sides so as to allow rotation of the shaft in the first and second loops.

* * * * *